Aug. 18, 1964
T. E. WITSKA
3,144,880
SEWER PIPE LEAK STOPPER
Filed Sept. 28, 1962
3 Sheets-Sheet 1
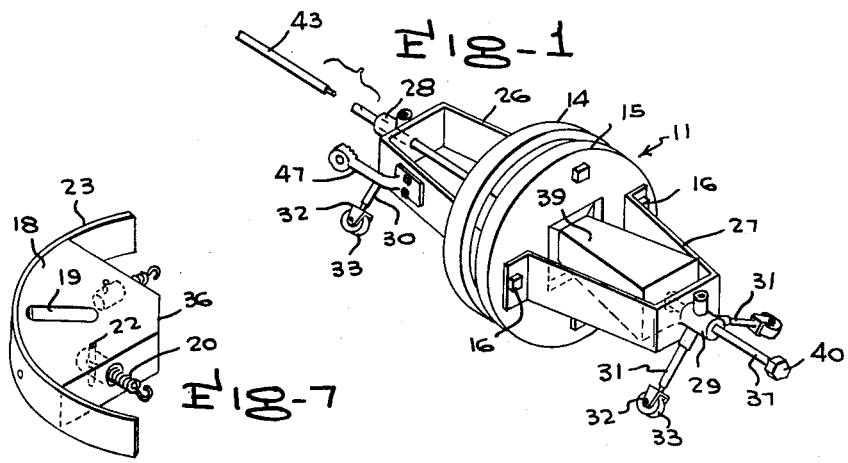
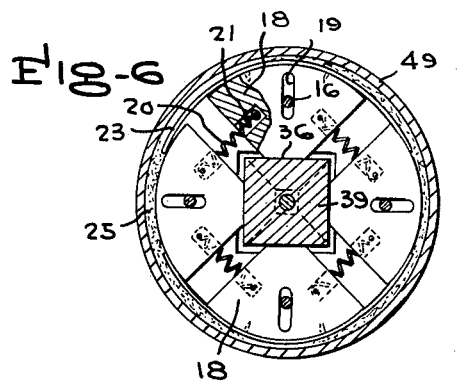
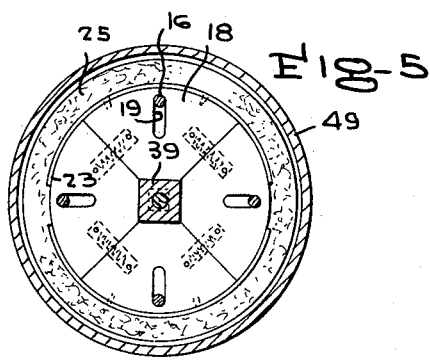
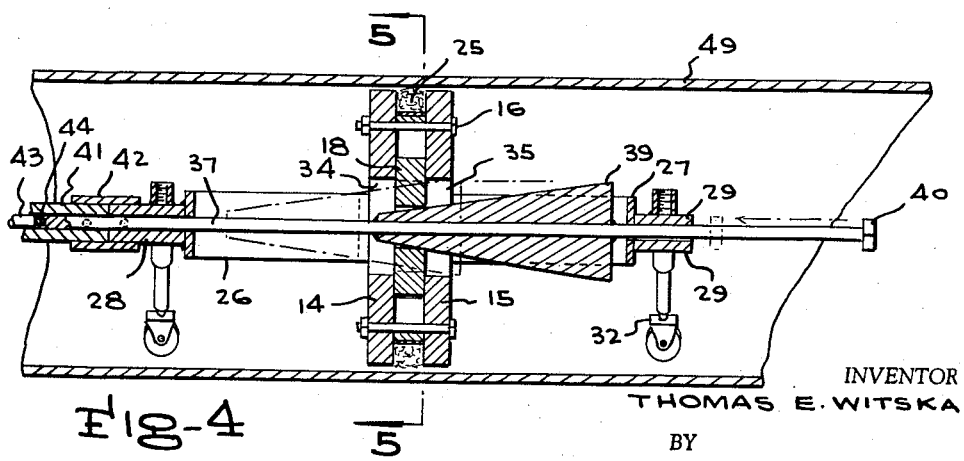
INVENTOR
THOMAS E. WITSKA
BY
McMorrow, Berman & Davidson
ATTORNEYS Aug. 18, 1964   T. E. WITSKA   3,144,880
SEWER PIPE LEAK STOPPER
Filed Sept. 28, 1962   3 Sheets-Sheet 2
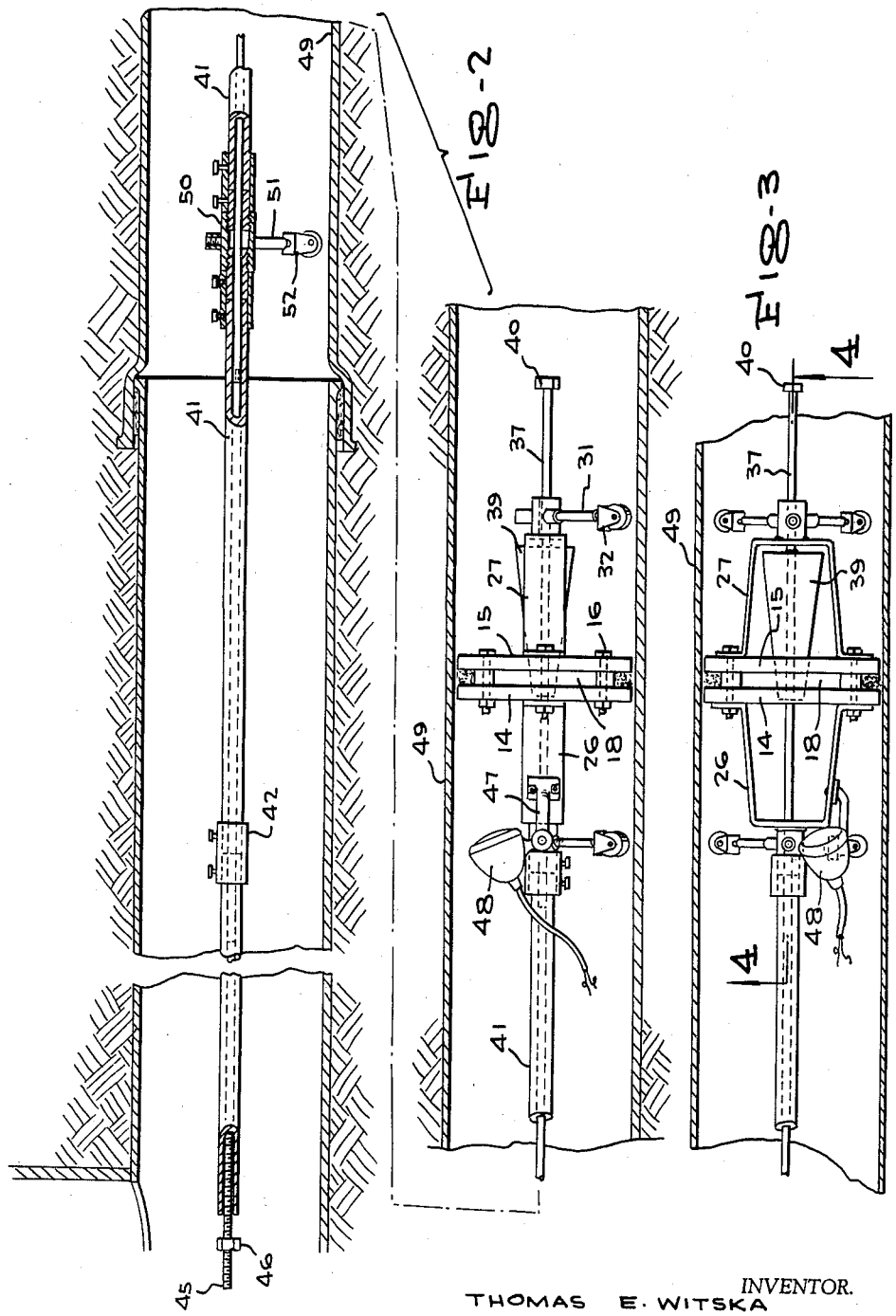
INVENTOR.
THOMAS E. WITSKA
BY
McMorrow, Berman & Davidson
ATTORNEYS

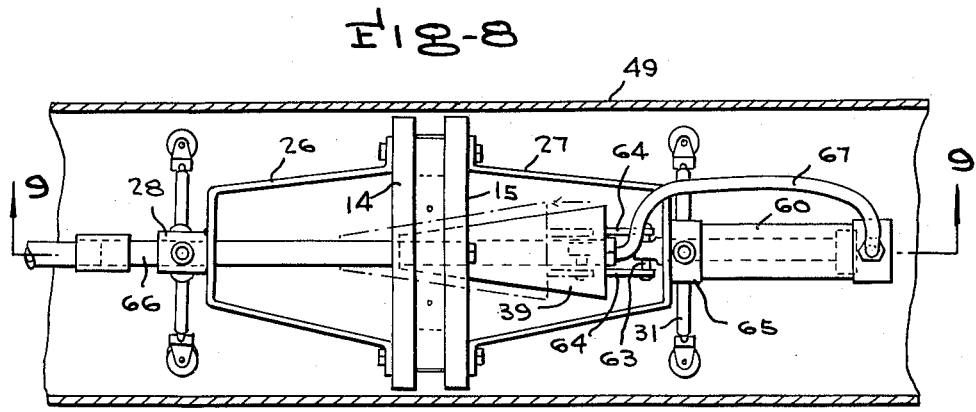

United States Patent Office 3,144,880
Patented Aug. 18, 1964

3,144,880
SEWER PIPE LEAK STOPPER
Thomas E. Witska, Pawleys Island, S.C., assignor of one-half to H. S. Clardy, Georgetown County, S.C.
Filed Sept. 28, 1962, Ser. No. 226,798
10 Claims. (Cl. 138—97)

This invention relates to apparatus for repairing conduits, and more particularly to an apparatus for stopping ground seepage leaks into underground sewer pipes and for repairing leaks in similar conduits.

A main object of the invention is to provide a novel and improved device for repairing conduits or for stopping leaks in conduits, said device being simple in construction, being easy to use, and enabling ground seepage leaks and similar defects in underground sewer pipes and similar conduits to be rapidly and efficiently sealed, even where the leaks occur in relatively remote portions of the conduits.

A further object of the invention is to provide an improved apparatus for sealing leaks in underground sewer pipes and similar conduits, said apparatus involving relatively inexpensive components, being durable in construction, being reliable in operation, and being provided with means for effectively controlling its operation even when it is employed to repair a leak located a substantial distance from the closest manhole or other point of access to the conduit.

Further objects and advantages of the invention will become apparent from the following description and claims, and from the accompanying drawings, wherein:

FIGURE 1 is a perspective view of one form of leak-repairing apparatus constructed in accordance with the present invention.

FIGURE 2 is a longitudinal vertical cross sectional view taken through an underground conduit and illustrating the manner in which an apparatus according to the present invention is arranged in the conduit for repairing a leak therein.

FIGURE 3 is a horizontal cross sectional view taken through the portion of the conduit of FIGURE 2 containing the main conduit-repairing assembly and showing said main assembly in top plan view.

FIGURE 4 is an enlarged vertical cross sectional view taken substantially on the line 4—4 of FIGURE 3.

FIGURE 5 is a transverse vertical cross sectional view taken substantially on the line 5—5 of FIGURE 4.

FIGURE 6 is a transverse vertical cross sectional view similar to FIGURE 5 but showing the shoe members of the assembly in expanded positions wherein the sealing material adjacent thereto is forced into the crack or leaking apertures of the conduit.

FIGURE 7 is a perspective view of one of the shoe members employed in the apparatus of FIGURES 1 to 6.

FIGURE 8 is a longitudinal vertical cross sectional view, similar to FIGURE 4 but showing a modified form of leak-repairing apparatus according to the present invention.

FIGURE 9 is a cross sectional view taken substantially on the line 9—9 of FIGURE 8.

FIGURE 10 is a transverse vertical cross sectional view taken through the intermediate portion of a still further modified form of conduit-repairing apparatus constructed in accordance with the present invention.

FIGURE 11 is a vertical cross sectional view taken substantially on the line 11—11 of FIGURE 10.

FIGURE 12 is a perspective view of one of the shoe members employed in the form of the invention shown in FIGURES 10 and 11.

FIGURE 13 is a horizontal cross sectional view taken through the shoe member of FIGURE 12 substantially on the line 13—13 thereof.

Referring to the drawings, and more particularly to FIGURES 1 to 7, 11 generally designates a typical embodiment of an improved conduit-repairing device constructed in accordance with the present invention. The device 11 comprises a pair of disc members 14 and 15 of like diameter which are secured together in spaced parallel relationship by a plurality of longitudinally extending fastening bolts 16 extending through the marginal portions of the disc members and through respective sector-shaped shoe bodies 18 slidably disposed between the disc members, said shoe bodies being formed with radial slots 19 in which the bolts 16 slidably engage. In the typical embodiment disclosed in FIGURES 1 to 7 the bodies 18 are quadrant-shaped and the four bodies are biased inwardly by respective coiled springs 20 connecting the intermediate portions of their radial sides, as is clearly shown in FIGURES 6 and 7. Thus, the ends of the coiled springs 20 are received in respective recesses 21 formed at the intermediate portions of the side edges of the bodies 18 and the ends of the coiled springs are fastened in said recesses by retaining pins 22 driven transversely through the recesses and through suitable fastening loops formed at the ends of the springs. The springs 20 tend to contract to urge the bodies 18 inwardly and towards each other, namely, toward the positions thereof shown in FIGURE 5 wherein the radial edges of said bodies are substantially in abutting contact with each other.

Secured on the peripheral surfaces of a pair of opposing bodies 18, 18 are respective arcuately curved rigid bar members 23 which project arcuately substantial distances from opposite sides of the associated shoe bodies 18, as is clearly shown in FIGURE 7, whereby the ends of the bar members 23 overlap substantial portions of the peripheries of the remaining shoe bodies, the bar members 23 respectively subtending angles of almost 180° each.

When the shoe members are in their contracted positions, such as is illustrated in FIGURE 5, there is defined between the peripheral portions of the disc members 14 and 15 and the peripheries of the shoe members a substantially annular recess adapted to receive a quantity of sealing material 25. This sealing material is forced outwardly when the shoe members are expanded, as will be presently described, whereby the sealing material is forced into cracks or crevices in the interior wall of a conduit.

Secured to the outside surfaces of the disc members 14 and 15, for example, by a pair of opposing bolts 16, 16 are respective generally U-shaped longitudinally extending rigid bracket members 26 and 27, said brackets extending longitudinally in opposite directions along the axis of the assembly. Axially secured to the bight portions of the bracket members are respective sleeve members 28 and 29, and secured to each sleeve member are the respective radially extending divergent pairs of arms 30, 30 and 31, 31. Swivelly connected to the end of each arm is a caster assembly 32 provided with a supporting roller 33, the supporting rollers acting to movably support the assembly in a conduit and to guide the assembly along the conduit substantially in axial alignment therewith.

The disc members 14 and 15 are formed with aligned square apertures 34 and 35 at their centers and the circular bodies 18 are formed with straight inner edges 36 which are arranged parallel to the respective sides of the apertures 34 and 35. Extending slidably through the guide sleves 28 and 29 is an actuating rod 37 which extends centrally through the apertures 34 and 35 and which has secured thereon a tapered wedge member 39, said wedge member being of square cross sectional shape with its sides engaged respectively by the straight inner edges 36 of the shoe bodies 18. As shown in FIGURE 4, the wedge member 39 flares forwardly in cross sectional area, namely, to the right, as viewed in FIGURE 4, so that when the rod member 37 is moved to the left, the wedge member forces the sector-shaped shoe bodies 18 outwardly, namely, from the normal position of FIGURE 5 to the expanded position of FIGURE 6.

The rod member 37 is provided at its forward end with an abutment head 40 which is engageable with the sleeve 29 to limit the expansion movement of the wedge member 39 to a position wherein the wedge member cannot move to the left beyond the straight inner edges 36 of the shoe bodies 18.

Any desired number of guide tubes 41 may be connected to the rear sleeve member 28, for example, by conventional coupling sleeves 42, as illustrated in FIGURE 2. Additional rod sections 43 may be connected to the actuating rod element 37, for example, by providing axial studs 44 on the ends of the sections which threadedly engage in tapped axial bores provided on the ends of the adjacent rod sections, as shown in FIGURE 4. The outermost rod section, shown at 45 in FIGURE 2, is externally threaded and provided with a stop nut 46 to limit the forward movement of the rods, for example, to the position shown in full line view in FIGURE 4, wherein the shoe bodies 18 are in contracted mutually abutting positions.

Secured on one of the side arms of the rear bracket member 26 is an outwardly projecting lamp bracket arm 47 adapted to support an electric lamp assembly 48, as shown in FIGURES 2 and 3, for illuminating the interior of the conduit section 49 in which the apparatus may be positioned.

Certain of the coupling sleeves connecting adjacent sections 41 of tubing may be provided with guide assemblies such as those provided on the brackets 26 and 27. Thus, as shown in FIGURE 2, a coupling sleeve 50 connecting a pair of adjacent tubing sections 41, 41 is provided with a pair of radially extending arms 51, similar to those provided on the sleeve members 28 and 29, the arms 51 having swivelly connected caster assemblies 52 at their ends to engage the inside wall surface of the conduit and support the guide tubing in axial position in the conduit. Obviously, as many supporting coupling assemblies 50, 51, 52 may be provided as are necessary to suitably support the guide tubing in substantially axial position in the conduit.

In operation, sealing material 25 is deposited in the annular recess defined between the peripheral portions of the disc members 14 and 15 and the peripheries of the shoe assemblies when the apparatus is introduced into the conduit to be repaired, being moved through the conduit until the working assembly 11 is located at the region containing the crack or fissure causing leakage in the conduit. The rod assembly comprising the sections 45, 43, 37 is then pulled rearwardly causing the shoe members to be expanded outwardly. It will thus be seen that movement of the rod 37 to the left, as viewed in FIGURE 4, causes the wedge 39 to act on the shoe edges 36 and to force the shoe assemblies outwardly, causing the bar members 23 to eject the sealing material 25 and to force the sealing material into the cracks or crevices in the conduit. After the cracks or crevices have been thus filled, the springs 20 return the shoe bodies 18 to their inward positions, shown in FIGURE 5, assuming that the rod 37 has been pushed forwardly to the position thereof illustrated in FIGURE 4, whereby the edges 36 of the shoe bodies 18 are free to move inwardly.

Referring now to the form of the invention shown in FIGURES 8 and 9, instead of employing a pull rod arrangement, the wedge 39 may be operated by a fluid pressure cylinder 60 mounted on the bight portion of the forward bracket member 27, the piston 61 of the fluid pressure cylinder 60 being connected to the forward end of the wedge member 39 by a transverse connecting pin 63 secured between a pair of supporting lugs 64, 64 provided on the end of the wedge member. The fluid pressure cylinder 60 is mounted axially, as shown in FIGURES 8 and 9, and is supported on a cap member 65 welded to the bight portion of the bracket 27. The supporting arms 31 are radially secured to said cap member. The wedge member 39 is rigidly secured to the forward section 66 of a line of tubing arranged axially in the conduit to be repaired and supported substantially in the same manner as the guide tubing described in connection with the form of the invention illustrated in FIGURES 1 to 7. The forward end of the tubing section 66 is connected by a flexible conduit 67 to the forward end of the fluid pressure cylinder 60.

As will be readily apparent, when fluid under pressure is introduced into the forward end of the cylinder 60 through the connecting tubing and the flexible conduit 67, the piston 61 is moved rearwardly, namely, to the left, as viewed in FIGURE 9, whereby the wedge member 39 acts on the shoe body members 18 to urge said shoe body members outwardly and to cause the sealing material to be forced into the cracks or crevices in the conduit being repaired, in the same manner as described in connection with the embodiment of the invention illustrated in FIGURES 1 to 7.

Referring now to the form of the invention shown in FIGURES 10 to 13, the wedge member 39 is operated in the same manner as in the form of the invention shown in FIGURES 1 to 7, namely, by a rod 37. The quadrant-shaped shoe members, shown at 18' are formed at their inner portions with chambers 70 which are connected by outwardly extending passages 71 to the space defined by the peripheries of the shoe members and the outer marginal portions of the disc members 14 and 15. Said space is designated in FIGURE 11 at 73. The chambers 70 are connected by flexible conduits 74 to a suitable source of sealing material, such as plastic cement material which is forced through the conduit 74 into the chambers 70 and which travels outwardly therefrom through the passages 71 into the annular space 73. In using the form of the invention shown in FIGURES 10 to 12, the apparatus is first positioned adjacent the cracks or crevices to be sealed, after which the sealing material is pumped into the space 73. After the space 73 has been filled with sealing material, the operating rod 37 is pulled rearwardly, as in the first-described form of the invention, causing the wedge member 39 to act on the shoe members 18' to work them outwardly and to force the sealing material into the cracks or crevices in the conduit. As in the previously described forms of the invention, the shoe members 18' are guided outwardly against the restraining tension of the connecting springs 20 by the cooperation of the fastening bolts 16 with the radial slots 19.

While certain specific embodiments of an improved apparatus for repairing leaks in underground sewer pipes and similar conduits have been disclosed in the foregoing decsription, it will be understood that various modifications within the spirit of the invention may occur to those skilled in the art. Therefore, it is intended that no limitations be placed on the invention except as defined by the scope of the appended claims.

What is claimed is:

1. A device for repairing conduits comprising a pair of disc members of like diameter, means securing said disc members in spaced parallel relation, a plurality of shoe members slidably disposed between said disc members and being movable outwardly, said shoe members normally being disposed inwardly, arcuate rigid bar means secured to at least certain of the shoe members and peripherally covering the space between the adjacent shoe members, the bar means and shoe members being shaped to define with the outer circumferential portions of said disc members a substantially annular space adapted to receive sealing material, means to guide said disc members through a conduit, and means to expand said shoe members, whereby to force the sealing material against the interior wall of the conduit.

2. A device for repairing conduits comprising a pair of disc members of like diameter, means securing said disc members in spaced parallel relation, a plurality of shoe members slidably disposed between said disc members and being movable outwardly, said shoe members normally being disposed inwardly, arcuate rigid bar means secured to at least certain of the shoe members and peripherally covering the space between the adjacent shoe members, the bar means and the shoe members being shaped to define with the outer circumferential portions of said disc members a substantially annular space adapted to receive sealing material, means to guide said disc members through a conduit, a tapered wedge member extending axially through said disc members and being engageable with the inner edges of said shoe member, and means to move the wedge members longitudinally in a direction to expand said shoe members, whereby to force the sealing material against the interior wall of the conduit.

3. A device for repairing conduits comprising a pair of disc members of like diameter, means securing said disc members in spaced parallel relation, a plurality of shoe members slidably disposed between said disc members and being movable outwardly, spring means connecting the shoe members and biasing the shoe members inwardly, said shoe members being normally disposed inwardly, arcuate rigid bar means secured to at least certain of the shoe members and peripherally covering the space between the adjacent shoe members, the bar means and shoe members being shaped to define with the outer circumferential portions of said disc members a substantially annular space adapted to receive sealing material, means to guide said disc members through a conduit, and means to expand said shoe members whereby to force the sealing material against the interior wall of the conduit.

4. A device for repairing conduits comprising a pair of disc members of like diameter, means securing said disc members in spaced parallel relation, a plurality of shoe members slidably disposed between said disc members and being movable outwardly, spring means connecting the shoe members and biasing the shoe members inwardly, said shoe members normally being disposed inwardly, arcuate rigid bar means secured to at least certain of the shoe members and peripherally covering the space between the adjacent shoe members, the bar means and shoe members being shaped to define with the outer circumferential portions of said disc members a substantially annular space adapted to receive sealing material, means to guide said disc members through a conduit, a tapered wedge member extending axially through said disc members and being engageable with the inner edges of said shoe members, and means to move the wedge member longitudinally in a direction to expand said shoe members, whereby to force the sealing material against the interior wall of the conduit.

5. A device for repairing conduits comprising a pair of disc members of like diameter, means securing said disc members in spaced parallel relation, a plurality of shoe members slidably disposed between said disc members and being movable outwardly, said shoe members having sector-shaped main body portions formed with radially directed slots, transverse bolt means connecting the disc members and passing through said slots, whereby to guide the shoe members for radial movement, spring means connecting the shoe members and biasing the shoe members inwardly, said shoe members normally being disposed inwardly, arcuate rigid bar means secured to at least certain of the shoe members and peripherally covering the space between the adjacent shoe members, the bar means and shoe members being shaped to define with the outer circumferential portions of said disc members a substantially annular space adapted to receive sealing material, means to guide said disc members through a conduit, and means to expand said shoe members, whereby to force the sealing material against the interior wall of the conduit.

6. A device for repairing conduits comprising a pair of disc members of like diameter, means securing said disc members in spaced parallel relation, a plurality of shoe members slidably disposed between said disc members and being movable outwardly, said shoe members having sector-shaped main body portions formed with radially directed slots, transverse bolt means connecting the disc members and passing through said slots, whereby to guide the shoe members for radial movement, spring means connecting the shoe members and biasing the shoe members inwardly, said shoe members normally being disposed inwardly, arcuate rigid bar means secured to at least certain of the shoe members and peripherally covering the space between the adjacent shoe members, the bar means and shoe members being shaped to define with the outer circumferential portions of said disc members, a substantially annular space adapted to receive sealing material, means to guide said disc members through a conduit, a tapered wedge member extending axially through said disc members and being engageable with the inner edges of said shoe members, and means to move the wedge member longitudinally in a direction to expand said shoe members, whereby to force the sealing material against the interior wall of the conduit.

7. A device for repairing conduits comprising a pair of disc members of like diameter, means securing said disc members in spaced parallel relation, a plurality of shoe members slidably disposed between said disc members and being movable outwardly, said shoe members normally being disposed inwardly, arcuate rigid bar means secured to at least certain of the shoe members and peripherally covering the space between the adjacent shoe members, the bar means and shoe members being shaped to define with the outer circumferential portions of said disc members a substantially annular space adapted to receive sealing material, means to guide said disc members through a conduit, a tapered wedge member of regular polygonal cross section extending axially through said disc members, said shoe members having straight inner edges engageable with respective sides of said wedge member, and means to move the wedge member longitudinally in a direction to expand said shoe members, whereby to force the sealing material against the interior wall of the conduit.

8. A device for repairing conduits comprising a pair of disc members of like diameter, means securing said disc members in spaced parallel relation, a plurality of shoe members slidably disposed between said disc members and being movable outwardly, said shoe members having sector-shaped main body portions formed with radially directed slots, transverse bolt means connecting the disc members and passing through said slots, whereby to guide the shoe members for radial movement, spring means connecting the shoe members and biasing the shoe members inwardly, said shoe members normally being disposed inwardly, arcuate rigid bar means secured to at least certain of the shoe members and peripherally covering the space between the adjacent shoe members, the bar means and shoe members being shaped to define with the outer circumferential portions of said disc members a substantially annular space adapted to receive sealing material, means to guide said disc members through a conduit, a tapered wedge member of regular polygonal cross section extending axially through said disc members, said shoe members having straight inner edges engageable with respective sides of said wedge member, and means to move the wedge member longitudinally in a direction to expand said shoe members, whereby to force the sealing material against the interior wall of the conduit.

9. A device for repairing conduits comprising a pair of disc members of like diameter, means securing said disc members in spaced parallel relation, a plurality of shoe members slidably disposed between said disc members and being movable outwardly, said shoe members normally being disposed inwardly, arcuate rigid bar means secured to at least certain of the shoe members and peripherally covering the space between the adjacent shoe members, the bar means and shoe members being shaped to define with the outer circumferential portions of said disc members a substantially annular space adapted to receive sealing material, rigid bracket members secured to the front and rear surfaces of the respective disc members and extending longitudinally in opposite directions, a plurality of radially extending arms secured to each bracket member, means on the ends of the arms supportingly engageable with the interior wall surface of a conduit, axially extending tube means connected to one of the bracket members for moving said disc members through the conduit, and means to expand said shoe members, whereby to force the sealing material against the interior wall of the conduit.

10. A device for repairing conduits comprising a pair of disc members of like diameter, means securing said disc members in spaced parallel relation, a plurality of shoe members slidably disposed between said disc members and being movable outwardly, said shoe members having sector-shaped main body portions formed with radially directed slots, transverse bolt means connecting the disc members and passing through said slots, whereby to guide the shoe members for radial movement, spring means connecting the shoe members and biasing the shoe members inwardly, said shoe members normally being disposed inwardly, arcuate rigid bar means secured to at least certain of the shoe members and peripherally covering the space between the adjacent shoe members, the bar means and shoe members being shaped to define with the outer circumferential portions of said disc members a substantially annular space adapted to receive sealing material, respective rigid bracket members secured to the outer surfaces of said disc members and extending longitudinally in opposite directions, a plurality of radially extending arms secured to each bracket member, means on the ends of the arms supportingly engageable with the interior wall surface of a conduit, axially extending rod means connected to one of the bracket members for moving said disc members through the conduit, a tapered wedge member of regular polygonal cross section extending axially through said disc members, said shoe members having stragiht inner edges engageable with respective sides of said wedge member, and means to move the wedge member longitudinally in a direction to expand said shoe members, whereby to force the sealing material against the interior wall of the conduit.

References Cited in the file of this patent

UNITED STATES PATENTS

| | | |
|---|---|---|
| 1,636,243 | Rasmussen | July 19, 1927 |
| 2,427,632 | Stephens | Sept. 16, 1947 |
| 2,520,397 | Green | Aug. 29, 1950 |
| 2,672,162 | Brauer | Mar. 16, 1954 |
| 2,929,410 | Morrison | Mar. 22, 1960 |

FOREIGN PATENTS

| | | |
|---|---|---|
| 212,715 | Great Britain | Mar. 20, 1924 |